United States Patent [19]

Wright et al.

[11] 3,964,735
[45] June 22, 1976

[54] TORSION BAR ADAPTOR FOR VEHICLE SPRINGS

[76] Inventors: Oliver L. Wright, P.O. Box 206, Lincoln, Mo. 65338; Wilbur D. Wright, P.O. Box 81, Lincoln, Mo. 65338

[22] Filed: Mar. 3, 1975

[21] Appl. No.: 554,570

[52] U.S. Cl. .................................. 267/25; 280/697
[51] Int. Cl.² ......................................... B60G 11/44
[58] Field of Search .................. 267/25, 57, 52, 27; 280/124 B

[56] References Cited
UNITED STATES PATENTS 2,988,352   6/1961   Masser ................................. 267/25

*Primary Examiner*—James B. Marbert
*Attorney, Agent, or Firm*—John A. Hamilton

[57] ABSTRACT

An adaptor for converting a vehicle spring suspension for use with a torsion bar connecting an axle housing affixed to the midpoint of the suspension spring directly to the vehicle chassis, when the suspension was not previously equipped with a torsion bar, the adaptor consisting of a plate adapted to be mounted between the original axle spring mount, which is not adapted to anchor one end of a torsion bar, and the spring itself, the adaptor plate having means anchoring it rigidly on the spring mount, and having projections operable to receive and anchor one end of a torsion bar.

6 Claims, 5 Drawing Figures

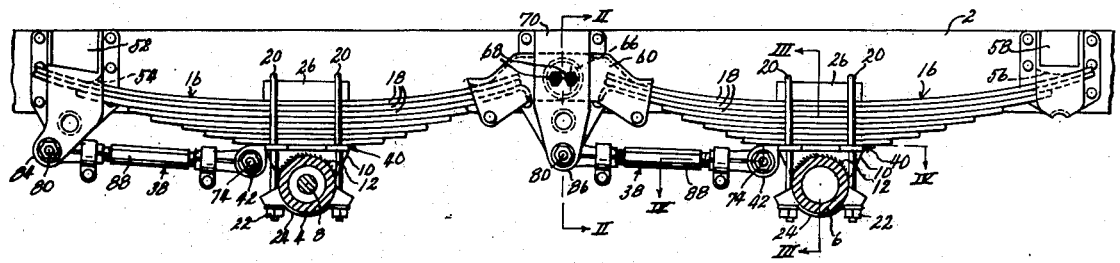

U.S. Patent June 22, 1976 3,964,735

TORSION BAR ADAPTOR FOR VEHICLE SPRINGS

This invention relates to new and useful improvements in vehicle spring suspensions, and has particular reference to truck spring suspensions of the torsion bar type.

In ordinary spring suspensions for the drive axle of a truck, the spring, consisting of an elongated bundle of spring leaves, is clamped approximately at its midpoint on a spring mount welded to the axle housing. The spring extends fore-and-aft of the vehicle, and at its ends is engaged in brackets affixed to the vehicle chassis, whereby to support said vehicle resiliently. In order that the vehicle may be driven by the ground-engaging wheels carried by said axle, one end of the spring must be fixed against fore-and-aft movement relative to the chassis, the spring itself thereby serving as a draft member. For various reasons it is preferable that the spring itself not be required to serve as a draft member, and that both ends thereof be "floating", or free to move fore-and-aft relative to the chassis. This requires a separate draft connection between the axle housing and the chassis, ordinarily consisting of a strong link connected at its respective ends to the axle housing and the chassis, the connections being vertically pivotable to accomodate vertical movement of the axle housing relative to the chassis. These links are commonly known as "torsion bars", and the conversion of ordinary spring suspensions to the torsion bar type is an extremely common modification performed on trucks. Kits containing the elements necessary for such conversion are widely sold, but are, within our knowledge, all subject to one particularly great difficulty in usage. The axle spring mounts of the ordinary suspensions are not adapted, or provided with means, to have a torsion bar connected thereto, with the result that a special spring mount having such means must be substituted for the original mount. The original mount, rigidly welded to the axle housing, must be cut away and the special mount welded in its place. This is a tedious, difficult job requiring many hours of labor, which renders the job expensive, and great difficulty is also experienced in insuring the proper and identical attitude of the mounts adjacent both ends of the axle, relative to said axle. This attitude is important since it determines the position of the springs and axle housing relative to the chassis and to the power drive shaft of the vehicle.

Accordingly, the primary object of the present invention is the provision of an adaptor which may be used in conjunction with the original spring mount, not equipped with a torsion bar connecting means, which provides the required torsion bar connection, and which does not require removal and replacement of the original axle spring mount, and utilizes said original axle spring mounts to insure proper attitude of the springs relative to the axle housing. Generally, this object is accomplished by the provision of an adaptor consisting of a plate adapted to be inserted and clamped between the spring and the original spring mount, and having projecting parts serving as mountings for one end of a torsion bar.

Another object is the provision of an adaptor of the character described having special means for preventing any possible slippage of the adaptor plate in its own plane between the spring and spring mount. Generally, this object is accomplished by means interengaging said adaptor plate with the standard U-bolts of the original spring mount.

Other objects are simplicity and economy of construction and efficiency and dependability of operation.

With these objects in view, as well as other objects which will appear in the course of the specification, reference will be had to the accompanying drawing, wherein:

FIG. 1 is a fragmentary side elevational view, partially in section, of a truck spring suspension system of the torsion bar type, including torsion bar adaptors embodying the present invention, FIG. 2 is an enlarged sectional view taken on line II—II of FIG. 1, FIG. 3 is an enlarged, fragmentary sectional view taken on line III—III of FIG. 1, FIG. 4 is an enlarged, fragmentary sectional view taken on line IV—IV of FIG. 1, and FIG. 5 is a perspective view of a torsion bar adaptor forming the subject matter of the present invention.

Like reference numerals apply to similar parts throughout the several views, and the numeral 2 applies to the main chassis beam at one side of a truck, to which a spring suspension system of a common type for that side of the truck is mounted. Actually shown is a tandem axle system, for carrying a front axle housing 4 and a rear axle housing 6, both extending horizontally and transversely of the truck. Both axle housings carry a ground-engaging wheel (not shown) rotatably at each end thereof, but the actual drive axle 8 is disposed in front axle housing 4, being driven by a differential (not shown) disposed generally at the midpoint of said axle housing, and only the wheels carried by said front axle housing are power driven. The rear axle housing wheels are not power driven, but serve merely as additional load supporting means. Such tandem axle systems are often installed, by way of modification, on trucks originally equipped with only a single rear axle, since highway load limits are often stated as a maximum allowable load per axle, and the addition of an extra axle this increases the total load the truck is allowed to carry.

Ordinarily, where the suspension is not of the torsion bar type, a spring support or mount 10 is welded to each axle housing adjacent each end thereof, the weld being indicated at 12, and each mount is provided with a substantially planar top surface 14. An elongated spring 16, consisting of a stack of spring leaves 18 of graduated length, extends fore-and-aft of the truck, and is supported about midway of its length on top surface 14 of the spring mount, being clamped thereto by a pair of clamp bolts 20 of inverted U-form, said bolts bridging the spring respectively in front of and behind the associated axle housing, said bolts extending below said axle housing and being secured by nuts 22 in a cradle member 24 abutting the lower side of the axle housing, said bolts being drawn very tight. A semi-cylindrical spacer 26 is inserted between the top surface of the spring and the bight portions of said bolts, to relieve stresses on the bolts. The spring leaves are ordinarily pre-assembled by means of a spring bolt 28 at their midpoints, the top surface 14 of the spring mount being provided with a recess 30 (see FIG. 3) for receiving the head 32 of the spring bolt, and the base of spacer 26 being provided with a recess 34 for receiving the nut 36 of said spring bolt. The engagement of bolt head 32 in recess 30 is intended to prevent any possible longitudinal slippage of the spring between mount surface 14 and the U-bolts. The U-bolts themselves closely engage both the side surfaces of spring mounts 10, and the front and rear sides of the axle housing.

In a conversion system including a torsion bar 38 associated with each spring 16, each torsion bar consisting of a very strong link which must be vertically pivotable at one end relative to the associated axle housing, and vertically pivotable at its opposite end relative to chassis beam 2, and the suspension was not originally intended for torsion bar usage, spring mount 10 provides no connection for the axle end of the torsion bar, and heretofore conversion to the torsion bar system has required that mount 10 be cut away and a special mount including torsion bar connections be substituted therefor. As previously noted, this is a tedious, time-consuming operation requiring many hours of expensive labor, and there is little assurance that the new mounts will be applied with the considerable accuracy required for efficient operation of the suspension.

The present invention accordingly proposes an adaptor which renders the above operation of cutting away the old mounts and substituting new mounts unnecessary, and takes full advantage of the accuracy of the factory-installed old mounts. Said adaptor is designated generally by the numeral 40, and includes a generally rectangular plate portion adapted to overlie and coincide with the top surface 14 of mount 10, and to support the midportion of spring 16 directly thereon, as shown, said adaptor plate being clamped in place between said spring and mount 10 by U-bolts 20. Extending from one end of said plate, and integral therewith, are mounting means 42 for one end of a torsion bar 38. As shown, this mounting means comprises a pair of ring-shaped lugs, coaxial with each other on a horizontal axis, and spaced apart. The plate is also provided with a central orifice 44 for receiving head 32 of spring bolt 28. As will be seen in FIG. 3, the presence of the adaptor plate may elevate said bolt head out of engagement with recess 30 of mount 10, which would deprive the spring of the anchorage against slippage on the mount normally provided by said engagement. To prevent this occurrence, there is provided a short locking pin 46 (see FIG. 3) adapted to be inserted into recess 30 and of sufficient length to project upwardly into aperture 44 of the adapter plate. This pin secures the adapter plate itself against slippage on mount 10, and the engagement of spring bolt head 32 in aperture 44 secures the spring against slippage on the adaptor plate. However, this positioning means for the adaptor plate may still be inadequate to support the adaptor plate against slippage in view of the sometimes very great forces delivered thereto in its own plane by the longitudinally stresses in the torsion bars. As an added positioning means, therefore, the adaptor plate is provided with a lateral extension 48 at each of its four corners, each of said extensions having an aperture 50 formed therethrough for receiving one of the four legs of the two U-bolts 20 therethrough. Thus the adaptor plate is secured against movement in its own plane, in any direction, with great rigidity.

To complete the description of a tandem axle, torsion bar suspension, it will be seen that the two springs 16 are mounted in fore-and-aft tandem relation to the truck chassis, the spring at the left of FIG. 1 being the forward of said springs. The forward end of left spring 16 is enclosed in a bracket 52 fixed to chassis beam 2, supporting on its upper surface a downwardly convex pad 54 of said bracket, whereby said spring can slide forwardly and rearwardly relative to said bracket. Similarly, the rearward end of right spring 16 is engaged by and supports the pad 56 of a bracket 58 also affixed to beam 2. The contiguous ends of the springs, that is the rearward end of the front spring and the forward end of the rear spring, are engaged in the opposite ends of a rocker arm 60, engaging and respectively supporting downwardly convex pads 62 and 64 formed at opposite ends of said rocker arm. Said rocker arm is pivotally mounted at its midpoint, on a horizontal transverse axis, on a hub member 66 fixed by bolts 68 in a bracket 70 fixed to chassis beam 2. Said rocker is commonly known as a "load equalizer", rocking on hub 66 when the truck traverses an uneven road surface to insure that the load carried by ground-engaging wheels carried by the respective axle housings 4 and 6 will be equal at all times. Thus both ends of each spring assembly are "floating", or slidable forwardly and rearwardly relative to the chassis, and all traction force delivered by the ground-engaging wheels of powered axle 4, or of both axles if both are powered, to truck chassis 2, must be delivered through torsion bars 38.

Torsion bars 38 are normally extended generally horizontally forwardly of their associated axle housings. As shown, each torsion bar is provided at its rearward end with a tubular cross-head 72 engageable between the mounting lugs 42 of its associated adaptor 40, and secured therebetween for vertical pivotal movement by a bolt 74 inserted axially through said lugs and said T-head, said bolt usually being enclosed in a firm rubber bushing 76 (see FIG. 4). The forward end of each torsion bar is provided also with a tubular cross-head 78 for receiving a bolt 80 enclosed in a rubber bushing 82 (see FIG. 2). The forward cross-head of the forward torsion bar is disposed between and secured by its bolt 80 to a pair of depending lugs 84 formed integrally with bracket 52. Similarly, the forward cross-head 78 of rear torsion bar 38 is engaged between and secured by its bolt 80 between a pair of depending lugs 86 formed integrally with central bracket 70. Bolts 74 and 80 are of course all parallel.

Each torsion bar 38 is provided intermediate its ends with a threaded turnbuckle 99 by means of which its effective length may be adjusted. This adjustment is important, particularly in connection with a powered axle, since it adjusts the vertical angularity between the inclined drive shaft of the vehicle and its universal joint connection to the geared differential carried by the axle housing. This angularity should not be great if the universal joint is to function efficiently, and of course varies with the inclination of the drive shaft. Extension or retraction of the torsion bars tends to rotate the axle housings about their axes, thus changing the vertical angularity of the differential-drive shaft connection. However, this adjustment is intended only for minor or fine adjustments, since large changes in the lengths of the torsion bars tends to cause reverse, or unequal, bending stresses in the respectively opposite end portions of each spring, which is not desirable. Accordingly, for major changes, it is preferable to insert a tapered shim plate (not shown), ordinarily between spring mount 10 and spring 16, but in the present case between adaptor plate 40 and spring 16. This permits angular adjustment of the axle housing about its axis, without at the same time introducing a "sinuous" bending stress to the spring. Such shims are already common in the art, and are not shown, it being important only to note that if said shim plates are used, then locking pin 46, as previously described, should be of sufficient length to extend upwardly through the adaptor plate and into the shim.

Operation of the torsion bar adaptor 40 is believed to be selfevident from the foregoing description of its construction and usage. Its advantages are also believed to be apparent. It permits the alteration of a suspension of to accomodate torsion bars when the system was not previously so equipped, without cutting away and replacing the original spring mounts, which is not only a tedious, time-consuming and expensive operation, but which also is accompanied by the danger of causing heat deformation of the axle housing, and also the danger that the replacement mounts will not be applied accurately, so that the spring supporting surfaces of the two mounts of a single axle housing are not precisely coplanar. Any inaccuracy in this respect will result in inaccurate, non-identical positioning of the two associated springs, which can cause malfunctions of the suspension systems. In other words, the adaptor depends for its properly accurate placement on the factory-installed original spring mounts, and takes full advantage of the accuracy of the factory installation.

While we have shown and described a specific embodiment of our invention, it will be readily apparent that many minor changes of structure and operation could be made without departing from the spirit of the invention.

What we claim and desire to protect by Letters Patent is:

1. For use in converting a vehicle spring suspension system to include torsion bars, said system including an elongated spring supporting the vehicle chassis at its ends and supported intermediate its ends on the generally planar top surface of a spring mount welded to an axle housing of said vehicle which carries rotatable ground-engaging wheels, and including suitable clamping means for affixing said spring against said top surface of said mount, and said torsion bars each constituting a rigid link vertically pivoted at one end to said vehicle chassis and adapted to be vertically pivoted to said spring mount at its opposite end, said mount not normally being provided with connections for said opposite end of said torsion bar, an adaptor comprising a planar plate portion adapted to be inserted between said axle spring mount and said spring, and to be secured therebetween by said clamping means, and extending portions integral with said plate portion and providing means for pivotal attachment of said opposite torsion bar end to said adaptor.

2. An adaptor as recited in claim 1 wherein said projections constitute a pair of horizontally spaced apart, coaxial, perforated lugs, whereby said opposite end of said torsion bar may be vertically pivoted to said adaptor by means of a pivot pin inserted coaxially through said lug perforations and transversely through said torsion bar.

3. An adaptor as recited in claim 1 wherein said clamping means comprises a pair of inverted U-bolts bridging said spring respectively forwardly and rearwardly of the associated axle housing, extending beyond said axle housing, and secured in a cradle engaging the side of said housing opposite from said spring mount, said U-bolts each enclosing edges of the plate portion of said adaptor, whereby to secure said adaptor plate against transverse movement in its own plane.

4. An adaptor as recited in claim 3 wherein the plate portion thereof is provided with extensions not overlying said spring mount, each of said extensions having a perforation formed therein for receiving one of the legs of said U-bolts, whereby said U-bolts secure said adaptor against movement in any direction in the plane of the plate portion thereof.

5. An adaptor as recited in claim 1 for use in connection with a spring consisting of a stack of spring leaves secured together by a vertical spring bolt at their midpoints, and wherein said spring mount has a recess formed therein in which the head of said spring bolt is normally engaged to prevent movement of said spring relative to the mount in the plane of said mount, said plate portion of said adaptor being provided with a central orifice adapted to receive said spring bolt head.

6. An adaptor as recited in claim 5 with the addition of a vertical locking pin adapted to be inserted into said spring mount recess, and being of sufficient length to project upwardly into said adaptor orifice, but to leave sufficient space within said orifice to receive said spring bolt head.

* * * * *